Patented Aug. 2, 1949

2,477,763

UNITED STATES PATENT OFFICE 2,477,763

TREATMENT OF CORN STEEPWATER

Wendell W. Moyer, Decatur, Ill., assignor to A. E. Staley Manufacturing Company, Decatur, Ill., a corporation of Delaware No Drawing. Application December 31, 1946, Serial No. 719,627

4 Claims. (Cl. 195—36)

This invention relates to the preparation of antibiotic substances by fermentation. More specifically, it pertains to the preparation of antibiotic substances, especially penicillin and streptomycin, by the culturing of suitable microorganisms in media containing corn steepwater material, having particular reference to the use of acidified corn steepwater by the direct addition thereto of an acid whose anion is not toxic to the microorganisms.

A principal object of the invention is the provision of an improved process for manufacturing antibiotic substances by culturing suitable microorganisms in media containing corn steepwater material whereby increased yields of the antibiotic substances per unit volume of culture medium are obtained.

Another object of the invention is to improve the recovery and purification of antibiotic substances from fermentation broths by causing the microorganisms to elaborate increased concentrations of the antibiotic substance in the broth.

An additional object of the invention is to lower the manufacturing cost of antibiotic substances recovered from fermentation broths by providing an improved fermentation process that furnishes increased yields to antibiotic substance per unit of manufacturing equipment.

Other objects of the invention will in part be obvious and will in part appear hereinafter.

The invention accordingly comprises the several steps and the relation of one or more such steps with respect to each of the others which are exemplified in the following disclosure and whose scope of application is indicated in the appended claims.

In a biological process, as in any chemical process, increased efficiency in the transformation of raw material into the desired end product is of prime importance. Where the yield in such processes is small and the cost of recovery of desired product from a large proportion of waste material is high, the yield becomes a controlling factor in the cost of production.

In the production of antibiotic substances from microorganisms by present fermentation methods, the yield of these substances is only a small fraction of one percent of the weight of nutrient materials used in the culture media. Consequently, the desired substance in the spent culture medium must be concentrated and isolated from relatively large volumes of liquor. This is commonly done by means of selective absorption or solvent extraction processes. In addition to this, the fermentation processes are relatively slow, requiring several days to provide maximum yield of product. As a result of these limiting factors, large and numerous units of equipment are required to provide even small quantities of purified product from a single fermentation.

The antibiotic substance being manufactured in by far the greatest quantities at the present time is penicillin. Ever since its production was begun during the recent war, its supply has not kept up with demand. At the present time, most producers of penicillin are increasing their plant capacity, or contemplating doing so, to supply the growing market. The plants will have to be expanded even more in the future to furnish adequate supplies of this extremely useful antibiotic substance unless means are provided for substantially increasing the yields of penicillin from existing equipment.

Corn steepwater has become a practically indispensable ingredient of the culture medium in the commercial production of penicillin because no other economically feasible adjunct has yet been found, which, when added to the culture medium, stimulates the mold to produce an equally high yield of the antibiotic substance.

It is generally believed that corn steepwater either contains a substance, or substances, which exert a specific effect on the mold and cause it to produce more penicillin than it otherwise would in a normal growth process in the ordinary nitrogenous-carbohydrate-salt culture media, or that the stimulatory effect is due to an unusually favorable combination and balance of growth factors provided in the culture media by the addition of the steepwater. These growth factors may include vitamins, amino acids, carbohydrates, and salts.

Corn steepwater is obtained from the steeps as a thin watery liquor having a pH of about 4. Its acidic reaction is due chiefly to lactic acid produced by fermentation of soluble sugars by lactic acid bacteria, since most of the initially present sulfurous acid disappears after the first few hours of steeping. Its density varies from about 3° to 7° Baumé, depending upon the steeping system used. The light steepwater thus obtained is then evaporated under vacuum to a fluid concentrate having a density of about 30° Baumé. In this form it is known as heavy steepwater, which may be shipped and stored without danger of immediate spoilage by putrefaction.

Although the yields of penicillin from unit volume of fermentation broth, or culture medium, have been increased many fold by using ordinary corn steepwater as a nutrient adjunct, they are still extremely small when calculated as percentages of the weights of nutrient materials used. Consequently much work has been directed toward further increasing the yield and thus reducing the cost of this extraordinary antibiotic substance. Some increases in yield have been obtained by use of newly developed mold strains, by refinements in fermentation and product-isolation techniques, and by use of culture media that are better balanced with respect to ingredient proportions. Other increases in yield, in addition to improved recovery and purification of the penicillin, have been obtained by pretreating the steepwater to remove certain objectionable ingredients as disclosed in copending applications filed May 5, 1945, and December 8, 1945, Serial Numbers 592,293 (now Patent No. 2,444,176, issued June 29, 1948) and 633,849, respectively. Despite the increased penicillin yields thus obtained, additional increases are greatly desirable.

The present invention provides for increased yields of penicillin in a simple and economical manner. This is accomplished by acidifying the corn steepwater nutrient adjuncts to a pH of about 3.0 to 3.9 and preferably about 3.5 to 3.7 when freshly prepared by the addition of an acid which does not have a toxic effect on the microorganisms being cultured. The reason for this unobvious result is unknown. The lower pH may effect a favorable hydrolytic or other reaction in the steepwater, or it may protect the liquid against certain deleterious actions, such as those that might be produced by microorganisms, but I do not wish to be confined to either of these suggested reasons.

Penicillin and other antibiotic substances are produced by preparing a culture medium comprising a dilute aqueous solution of corn steepwater material, carbohydrates, nitrogen compounds and mineral salts, adjusting the pH of the medium to the proper value, sterilizing it by autoclaving, cooling it, inoculating it with the desired microorganism, allowing it to grow under optimum conditions of agitation, aeration, and temperature until the concentration of antibiotic substance in the medium reaches a maximum value, and then recovering and purifying the antibiotic substance by suitable procedures.

Consideration of the following individual variables relating to the production of a suitably acidified corn steepwater nutrient adjunct will assist in the understanding of this invention.

*Kind of starting corn steepwater product.*—The invention is applicable to any corn steepwater nutrient adjunct used in the production of antibiotic substances by fermentation, particularly in the production of penicillin. Ordinary heavy corn steepwater is greatly improved as a penicillin nutrient adjunct if it is acidified in accordance with this invention. The treated corn steepwater materials described and recommended as nutrient adjuncts in the above mentioned copending applications are likewise improved by acidification. Also, the amino acid supplemented corn steepwater adjunct described in another copending application filed December 31, 1946, Serial No. 719,628, is improved as a nutrient material if it is acidified as disclosed herein.

*Kind of acid.*—The invention is limited to the use of strong inorganic and organic acids which do not have a toxic effect on the microorganisms being cultured. Many organic acids are unsuitable because the quantities required to lower the pH of the liquid to the desired range adversely affect the growth of the microorganisms. Hydroxy organic acids, such as lactic and citric, may be used in the production of penicillin because, in addition to being moderately strong acids, they are metabolized by the mold. The preferred acids are the strong mineral acids such as hydrochloric, sulfuric, phosphoric, and nitric acids. Hydrochloric acid has the most general utility because the chloride ions, to the extent added, do not seem to have any adverse effect on the microorganisms used. Phosphoric acid is somewhat less desirable than hydrochloric acid because of its higher cost and also because it acts as a buffer in the culture medium, preventing the optimum rate of pH increase therein during the fermentation. Nitric acid is still more expensive, but it may be successfully used provided the nitrate content of the base culture medium is adjusted to allow for the nitrate ions introduced as nitric acid.

*Range of pH.*—Ordinary heavy steepwater has a pH ranging from about 3.9 to 4.5. Differences in pH occur from time to time because of natural variations in steeping. According to the present invention, the steepwater pH is lowered to a value lying within a range of about 3.0 to 3.9, the preferred range being 3.5 to 3.7. Some effect is obtained above 3.7 pH. Below 3.5 pH, the acid effect is present, but the deleterious effect of the increasing concentration of the acid anion on the fermentation becomes noticeable.

*Time of treatment.*—The preferred time to acidify the steepwater or steepwater material is immediately after processing. With ordinary corn steepwater, this time is immediately after the liquor has been concentrated by evaporation. In case a special steepwater nutrient is made, say, by the aluminum salt process described in copending application, Serial Number 633,849, the acid is preferably added at the end of the process, i. e., after the final crystallization and filtration steps. In either of the two foregoing cases, the acid may, as an alternative procedure, be added to the light steepwater before it is concentrated or processed, but no additional advantage accrues and increased equipment corrosion occurs. The longer the acidification is delayed after processing of the steepwater product, the less effective the treatment becomes. After about one week after processing, acidification of the product results in only slight increases in yield of antibiotic substance. The recommendation that the steepwater product be acidified within not more than one week after processing is based on the assumption that the light steepwater is processed immediately after being drawn from the steeps. If this is not the case, the allowable interval of one week between processing and acidification should be decreased by the time interval between steeping and processing.

This invention is applicable to the preparation of antibiotic substances in general by fermentation, especially to the fermentation production of penicillin and streptomycin. With respect to the preparation of penicillin in particular, neither the type of mold nor the fermentation method used is a limiting factor.

The following examples illustrate the application of this invention to the production of penicillin. In these examples, fermentations were carried out by both surface and submerged methods, and assays were made by the standard cup-plate and dilution procedures. The fermentation media comprised corn steepwater, lactose, and mineral supplements according to the regular formulae. The surface culture tests were made with *P. notatum* 1249; and the submerged tests were made with *P. chrysogenum* X-1612 and Q-176.

Example 1

To 15,100 parts by volume of light corn steepwater taken directly from the steeps, having a pH of 4.2 and a density of 5.8° Baumé at 35° C., was added 200 parts by volume of 36 percent hydrochloric acid to lower its pH to about 3.1. The acidified liquor was vacuum concentrated to a density of about 30° Baumé and used according to the regular formula in a culture medium for producing penicillin by the surface culture method. The increase in the broth yield of penicillin over that obtained in a control test using the unacidified steepwater stock was about 25 percent.

Example 2

One hundred parts of volume of the same lot of light steepwater used in Example 1 was acidified to 3.1 pH with 1.32 parts by volume of 70 percent nitric acid. The acidified liquor was vacuum concentrated to a density of about 30° Baumé and then used according to the usual formula in a culture medium for the production of penicillin, except that the sodium nitrate supplement was omitted from the base medium. The maximum broth yield of penicillin obtained in this example was about 20 percent greater than the corresponding yield in a control run using the unacidified steepwater heavy steepwater.

Example 3

Light corn steepwater was evaporated under reduced pressure to a density of about 30° Baumé immediately after being removed from the steeps. To 4560 parts by weight of the heavy steepwater thus obtained, having a pH of about 4.2, was added 370 parts by weight of 11 percent hydrochloric acid. The acidified liquor, having a pH of 3.8 and a density of 28.4° Baumé, was used in a culture medium for making penicillin by the submerged culture method. The maximum broth yield of penicillin thus obtained was about 30 percent higher than the corresponding yield furnished by a control test using the unacidified heavy steepwater.

Example 4

A special steepwater nutrient was made by mixing 15° Baumé corn steepwater at 160° F. with hydrated aluminum sulfate, using 3 percent of dry substance aluminum sulfate based on the steepwater solids, filtering off the precipitated aluminum phytate and other insoluble materials, vacuum concentrating the filtrate to a density of about 30° Baumé, cooling the concentrate to about 80° F., stirring it gently at that temperature for about 12 hours, and then filtering off the crystallized material. The filtrate, having a density of 28.6° Baumé and a pH of about 4.1 was acidified to a pH of 3.65 with 6 N hydrochloric acid. The acidified liquor, having a density of 28.0° Baumé, was tested by the submerged growth process. It gave a maximum broth yield of penicillin that was about 80 percent higher than the corresponding yield from a control run using the unacidified special steepwater nutrient.

The invention is not limited to the specific materials and conditions recited in the foregoing examples, which are illustrative only.

The expressions "corn steepwater material" and "corn steepwater nutrient adjunct," used hereinbefore and in the appended claims, are synonymous and designate generically the whole corn steepwater solids and biologically active fractions thereof, which, when added to the culture media of microorganisms secreting antibiotic substances, stimulate the microorganisms to generate increased amounts of those substances.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In the manufacture of penicillin by culturing penicillin-producing microorganisms in media containing corn steepwater materials, the improvement comprising acidifying concentrated corn steepwater to a pH of about 3.0 to 3.7, within one week of the time it is drawn from the steeps, with a strong acid whose anion is non-toxic to the microorganisms at the resulting concentration.

2. In the manufacture of penicillin by culturing penicillin-producing microorganisms in media containing corn steepwater materials, the improvement comprising acidifying concentrated corn steepwater with hydrochloric acid to a pH of about 3.0 to 3.7, within one week of the time it is drawn from the steeps.

3. In the manufacture of penicillin by culturing penicillin-producing microorganisms in media containing corn steepwater materials, the improvement comprising acidifying concentrated corn steepwater with sulfuric acid to a pH of about 3.0 to 3.7, within one week of the time it is drawn from the steeps.

4. In the manufacture of penicillin by culturing penicillin-producing microorganisms in media containing corn steepwater materials, the improvement comprising acidifying concentrated corn steepwater with nitric acid to a pH of about 3.0 to 3.7, within one week of the time it is drawn from the steeps.

WENDELL W. MOYER.

REFERENCES CITED

The following references are of record in the file of this patent:

UNITED STATES PATENTS

| Number | Name | Date |
| --- | --- | --- |
| 1,434,462 | Wagner | Nov. 7, 1922 |
| 1,918,812 | Kerr et al. | July 18, 1933 |
| 2,067,002 | Pollak | Jan. 5, 1937 |
| 2,298,623 | Jurgensen et al. | Oct. 13, 1942 |
| 2,302,393 | Schopmeyer | Nov. 17, 1942 |

OTHER REFERENCES

Moyer et al.: Jr. Bacteriology, vol. 51, January 1946, pp. 66, 70, 72.

Coghill: Monthly Progress Report No. 13, Committee on Medical Research, O. S. R. D., June 26, 1943, page one.

Summary, "Corn Steep Water as Nutrient for Penicillin," Kennedy. Paper presented at Penicillin Technical Meeting, New York, Jan. 21-22, 4 pages.